United States Patent
Stratico et al.

(10) Patent No.: US 6,591,721 B2
(45) Date of Patent: Jul. 15, 2003

(54) ASSEMBLY LINE METHODS AND APPARATUS FOR MANUFACTURING DYNAMO-ELECTRIC CORES

(75) Inventors: Gianfranco Stratico, Siena (IT); Antonio Lumini, Florence (IT)

(73) Assignee: Axis USA, Inc., Tampa, FL (US)

( * ) Notice: Subject to any disclaimer, the term of this patent is extended or adjusted under 35 U.S.C. 154(b) by 52 days.

(21) Appl. No.: 09/819,307

(22) Filed: Mar. 28, 2001

(65) Prior Publication Data

US 2001/0037560 A1 Nov. 8, 2001

Related U.S. Application Data

(60) Provisional application No. 60/194,200, filed on Apr. 3, 2000.

(51) Int. Cl.$^7$ .......................... B23B 13/00; B23B 25/00
(52) U.S. Cl. ........................... 82/162; 82/173; 29/33 R; 29/33 P
(58) Field of Search .................. 82/1–11, 123, 82/124, 129, 132, 133, 162, 901, 118, 173; 408/33, 34, 42; 29/33 R, 27 R, 33 P, 729, 732

(56) References Cited

U.S. PATENT DOCUMENTS

| | | | | |
|---|---|---|---|---|
| 3,286,595 A | * | 11/1966 | Wollenhaupt | ................ 408/35 |
| 3,559,256 A | * | 2/1971 | Lemelson | .................... 29/33 P |
| 3,854,889 A | * | 12/1974 | Lemelson | .............. 198/341.05 |
| 4,984,353 A | | 1/1991 | Santanandrea et al. | |
| 5,454,284 A | | 10/1995 | Sbalchiero et al. | |

OTHER PUBLICATIONS

U.S. patent application Ser. No. 09/409,038, Becherucci et al., filed Sep. 29, 1999.

* cited by examiner

*Primary Examiner*—Henry W. H. Tsai
(74) *Attorney, Agent, or Firm*—Fish & Neave; Robert R. Jackson; Manu J. Tejwani

(57) ABSTRACT

A workstation is provided for concurrently processing dynamo-electric machine core subassemblies that are at different stages of a dynamo-electric machine core manufacturing process. The workstation is configured to include a sequence of step processing units. Different units receive and process subassemblies that are at different stages of manufacture. A movable transferor substantially simultaneously advances a group of subassemblies forward through the sequence of units. The workstation can be integrated with conventional assembly line transport systems. These transport systems may be used to deliver input subassemblies to the workstation and to carry away output subassemblies. Subassemblies may be loaded into the workstation at the same time as finished subassemblies are unloaded from the workstation.

65 Claims, 5 Drawing Sheets

FIG. 7

ASSEMBLY LINE METHODS AND APPARATUS FOR MANUFACTURING DYNAMO-ELECTRIC CORES

This application claims the benefit of U.S. provisional application No. 60/194,200, filed Apr. 3, 2000.

BACKGROUND OF THE INVENTION

The present invention relates to improved solutions for conveying dynamo-electric machine core components (e.g., armatures or stators for electric motors, generators, or alternators) between different processing machines of a manufacturing assembly line.

In a typical manufacturing assembly line, processing machines for processing dynamo-electric core subassemblies (i.e., components at various stages of a manufacturing process) are placed at workstations along the assembly line. Core subassemblies are often transported along the assembly line from one machine to another by a conveyor apparatus while mounted on pallets. Particular disposition of processing machines along an assembly line, the transport routes by which the pallets reach the machines, and the sequences with which the pallets reach the machines have been described, for example, in Santandrea et al. U.S. Pat. No. 4,984,353, and Becherucci et al. U.S. patent application Ser. No. 09/409,038, which are hereby incorporated by reference herein in their entireties.

Santandrea et al. and Becherucci et al. disclose systems in which subassemblies that have been processed by a machine at a work station are transferred to pallets. The pallets are then transported along the conveyor apparatus to another workstation in the assembly line for processing according to the next step of the manufacturing process. Once the pallets reach the other work station, the subassemblies are transferred from the pallets into a machine at the other workstation for the next step of processing. This process of transferring the subassemblies in and out of machines and of moving the subassemblies from one workstation to another is repeated for each of the various steps of the manufacturing process. The repeated transfers back and forth between pallets and machines, and the repeated movements of pallets between workstations, both contribute to overall manufacturing processing time and expense.

Consideration is now being given to ways of enhancing workstation configurations and subassembly transport mechanisms to improve the overall efficiency of dynamo-electric core manufacturing systems.

SUMMARY OF THE INVENTION

In accordance with the principles of the invention, an assembly line workstation is configured to include a sequence of step-processing machines or units for concurrently processing dynamo-electric machine core subassemblies that are at different stages of manufacture. The units are placed in sequence to perform process steps in the same order as the sequence of steps in the manufacturing process.

The workstation includes a row of receiving structures designed to hold subassemblies in position for processing by the units. The receiving structures may, for example, be spaced-apart seats designed to support extreme-portions of the subassemblies. The row may include input and output receiving structures that serve as waiting locations for input and output subassemblies. The row of receiving structures is supported on beam structures running across the length of the workstation. These beam structures may, for example, be a pair of beams that are continuous over the length of the row of receiving structures.

A movable transferor moves subassemblies forward along the row of receiving structures. The transferor is designed to simultaneously advance a group of subassemblies. The transferor may be a movable central beam with a row of holders aligned with the row of receiving structures. The holders are shaped to lift the subassemblies out of the receiving structures and to hold the subassemblies while moving them forward.

Suitable mechanical linkages impart controlled motion to the central beam. The controlled motion is designed to move the holders along paths to lift the subassemblies from the row of receiving structures and redeposit the subassemblies in the adjoining receiving structures. The paths may, for example, be rectangular paths starting from positions underneath the receiving structures. Traveling along the rectangular paths, the holders first move vertically upwards lifting subassemblies from the receiving structures, and then move horizontally forward to be above the adjoining receiving structures. Vertically downward motion redeposits the subassemblies in the adjoining receiving structures. Finally, backward horizontal motion returns the holders to their starting positions.

In an embodiment of the present invention the processing units and the receiving structures may be placed, for example, above an assembly line floor, on a table top. The movable central beam operates above the table top between the row of receiving structures. Mechanical linkages that impart motion to the central beam may be placed underneath the table top. The table top, for example, supported on legs, may be suitably designed to reduce the effect of floor vibrations and provide mechanical stability for processing operations.

Since the subassemblies are moved forward through the workstation together in a group, every time a fully processed subassembly is moved to the output receiving structure, the input receiving structure becomes vacant and available to receive new input to the workstation. An input subassembly may be loaded into the workstation (i.e., placed in the vacant input receiving structure) at the same time as the output subassembly is unloaded from the workstation. The loading and unloading operations may occur even as other subassemblies are being processed by the sequence of units in the workstation.

BRIEF DESCRIPTION OF THE DRAWINGS

Further features of the invention, its nature, and various advantages will be more apparent from the following detailed description of the preferred embodiments and the accompanying drawings, wherein like reference characters represent like elements throughout, and in which:

FIG. 2 is taken along line 2—2 in FIG. 1.

FIG. 3 is taken along line 3—3 in FIG. 1.

FIG. 4 illustrates the trajectory of a subassembly holder as it moves to lift and advance an armature subassembly from one receiving structure to an adjoining receiving structure in accordance with the principles of this invention. FIG. 4 is a side elevational view similar to FIG. 3.

FIG. 6a is a side elevational view partly in cross section of the workstation shown in FIG. 5. FIG. 6a is taken along line 6—6 in FIG. 5.

FIG. 6b is cross sectional view of an isolation block connecting a carriage and a beam both of which support receiving structures. FIG. 6b is taken along line A—A in FIG. 5.

FIG. 7 is taken along line 7—7 in FIG. 5.

DETAILED DESCRIPTION OF THE PREFERRED EMBODIMENTS

The present disclosure concerns methods and apparatus for conveying dynamo-electric machine core subassemblies to processing machines in a manufacturing line in order to completely process a finished core. Workstation configurations which contribute to improving the overall efficiency of the manufacturing line are disclosed.

In accordance with the present invention, a workstation is configured to include a sequence of step-processing machines. The machines receive and process subassemblies that are at various stages of the manufacturing process. The specific process step performed by a machine determines the machine's place in the sequence. The machines are placed in sequence to perform process steps in the same order as the sequence of steps in the manufacturing process.

A belt conveyor runs alongside the sequence of step-processing machines. Subassemblies may be transported to the workstation from upstream locations in suitable carriers such as pallets, containers, or boxes. Subassemblies that require processing by the step-processing machines are unloaded from their carriers at an input location. The unloaded subassemblies are transferred into the workstation for processing. The emptied carriers may travel on the belt conveyor alongside the step-processing machines. Subassemblies that have been processed by the sequence of step-processing units may be reloaded into the empty carriers at a downstream output location. The belt conveyor also provides a bypass path for transporting subassemblies through the workstation when the subassemblies do not require processing by the step-processing units. Carriers containing subassemblies that do not require processing may be directly routed from upstream locations to downstream locations over the belt conveyor without unloading and reloading subassemblies at the workstation.

Subassemblies that are ready for processing by the step-processing machines within the workstation are positioned on a row of subassembly receiving structures. The row of receiving structures is aligned with the step-processing machines. At least one receiving structure is associated with each machine in the sequence. Each machine in the sequence processes subassemblies positioned on the receiving structure associated with the machine. In addition to receiving structures associated with individual machines in the sequence, the row of receiving structures may also include an input receiving structure in an upstream area. The input receiving structure may serve as a waiting location for input subassemblies, i.e., subassemblies transferred from carriers into the work station for processing. Further, the row of receiving structures may also include an output receiving structure in a downstream area. The output receiving structure may be used as a waiting location for-output subassemblies, i.e., subassemblies that have been processed by the sequence of step-processing units and are ready to be transported away from the workstation.

A movable transferor places subassemblies that are ready for processing by the step-processing machines on the receiving structures associated with the machines. The movable transferor is designed to substantially simultaneously advance a group of subassemblies forward along the row of receiving structures. The transferor has a row of holders shaped to lift and hold the group of subassemblies. The row of holders is aligned with the row of receiving structures.

In operation, the transferor moves from a starting position to lift the group of subassemblies out of the row of receiving structures holding the subassemblies. The lifted subassemblies are held in the row of holders. The transferor then moves forward and places the held subassemblies in adjoining receiving structures. Each held subassembly is placed in an adjoining receiving structure which is forward from the receiving structure from which the subassembly was lifted. After placing the subassemblies in the forward receiving structures, the transferor returns to its starting position. In this manner a group of subassemblies that are at different stages of processing is advanced and positioned in the sequence of step-processing machines. The group of subassemblies positioned in the sequence of step-processing machines can then be processed concurrently.

Since the subassemblies are moved forward through the workstation together in a group, every time a fully processed subassembly is moved to the output receiving structure, the input receiving structure becomes vacant and available to receive new input to the workstation. An input subassembly may be loaded into the workstation (i.e., placed in the vacant input receiving structure) at the same time as the output subassembly is unloaded from the workstation (i.e., picked up from the output receiving structure).

In order that the invention herein described can be fully understood, the subsequent description is set forth in the context of its application to the manufacture of armatures. It will, however, be understood that the invention is equally applicable to other types of dynamo-electric core components such as stators, etc.

Figures 1, 2:
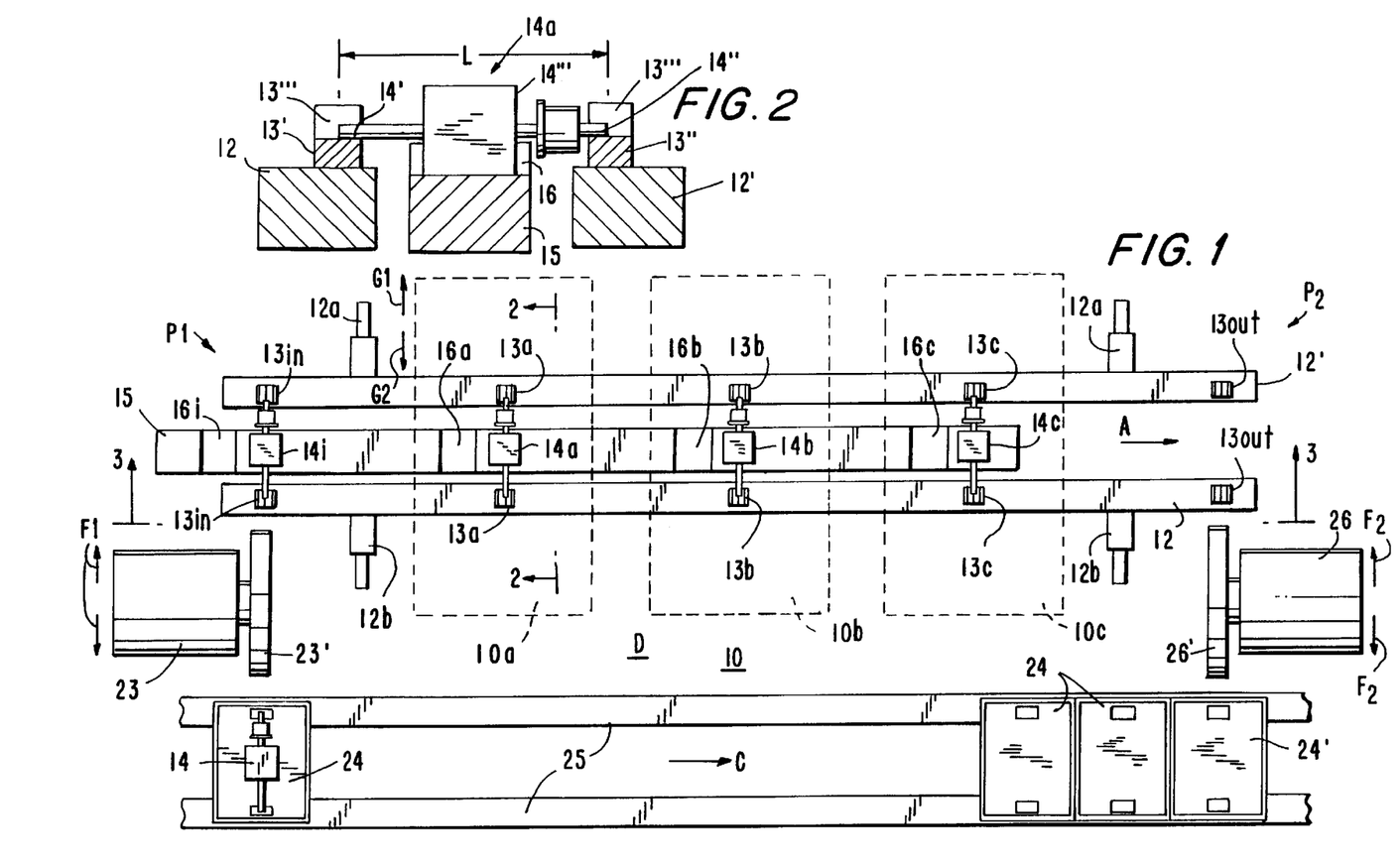
FIG. 1 is a schematic layout of a portion of a manufacturing assembly line employing a work station configured in accordance with the principles of this invention.
FIG. 2 is a side elevational schematic view partly in cross section showing an armature subassembly supported by a receiving structure in accordance with the principles of this invention.

An embodiment of the present invention is described herein with reference to a workstation and to work pieces illustrated in FIGS. 1–4. Armature subassemblies 14 are used herein as illustrative work pieces. Armature subassemblies 14 have central ferromagnetic core portions 14''' with axial shafts protruding from central portions 14'''. The axial shafts have extreme portions 14' and 14''. The distance between extreme outer ends of the axial shafts is defined to be the armature length, L (FIG. 2).

FIG. 1 shows a schematic layout of a portion of an armature manufacturing assembly line that uses workstation 10 to concurrently process a group of armature subassemblies 14. Workstation 10 is configured to include a sequence of processing units, for example, three units 10a, 10b, and 10c that process individual armature subassemblies 14 according to three consecutive steps or stages of a manufacturing process.

Processing unit 10a may, for example, be a machine that measures the commutator diameter of an armature subassembly 14. Unit 10a may use measurement techniques described, for example, in Sbalchiero et al. U.S. Pat. No. 5,454,284. Unit 10b may, for example, be a cutting machine for turning (i.e., cutting) the commutator of subassembly 14.

Unit 10b may be used to bring commutator diameter values to within desired product specifications as also described, for example, in Sbalchiero et al. Further, unit 10c may, for example, be a brushing machine for removing residual chips and other debris that remain attached to subassembly 14 after the turning operations of unit 10b. The units 10a, 10b, and 10c are placed in sequence along direction A to perform the processing steps of measuring diameter, turning, and brushing in the same order as these steps are defined in the manufacturing process for manufacturing an armature.

An individual subassembly 14 passing through workstation 10 is sequentially processed by units 10a, 10b, and 10c (i.e., subassembly 14 is first processed by unit 10a, then by unit 10b, and finally by unit 10c). As the later units in the sequence are processing subassemblies 14 at later stages of the manufacturing process, the earlier units are available to process other subassemblies 14 that are at earlier stages of the manufacturing process. In a loaded assembly line, i.e., an assembly line with continuous or steady work flow, subassemblies 14 that have been processed to different stages of manufacture may be available at the same time for further processing. Units 10a, 10b, and 10c can substantially concurrently perform various processing steps of the manufacturing process on different subassemblies 14 that are available for processing.

Subassemblies 14 that undergo processing in workstation 10 are positioned on suitable work surfaces for processing by units 10a, 10b, and 10c. A suitable work surface may, for example, be a receiving structure such as receiving structure 13a that holds armature subassembly 14a in position for processing. Receiving structure 13a may, for example, be a matched pair of blocks 13' and 13" illustrated in FIG. 2. Blocks 13' and 13" have V-seats 13''' (FIG. 3) that have suitable shapes for seating extreme portions 14' and 14" of axial shafts protruding from center portions 14''' of subassemblies 14. FIG. 2 is a side elevational view, partly in cross section, showing armature subassembly 14a that has an armature length L supported by blocks 13' and 13". Extreme portions 14' and 14" of axial shafts are seated in V-seats 13'''.

Receiving structures 13a, 13b, and 13c are associated with units 10a, 10b, and 10c, respectively. These receiving structures are supported on a pair of spaced-apart beam structures running along the workstation 10 in workflow direction, A. Each of these beam structures may be formed from one continuous beam or from more than one discontinuous beam segments. FIG. 1 shows, for example, continuous beams 12 and 12' that run across workstation 10 in direction A. Blocks 13' and 13" that form receiving structures 13a, 13b, and 13c are supported on beams 12 and 12', respectively. Beams 12 and 12' themselves are adjustably supported on supports 12a and 12b. The distance between beams 12 and 12' may be changed by moving them laterally on supports 12a and 12b in directions G1 and G2, respectively. Beams 12 and 12' also support receiving structures 13in and 13out at reference locations P1 and P2, respectively. Receiving structures 13in and 13out may be used as waiting locations for input to and output from workstation 10, respectively. The spacing between adjacent receiving structures 13 is substantially equal.

Armature subassemblies 14 can be processed by units 10a, 10b, and 10c while they (subassemblies 14) are respectively positioned in receiving structures 13a, 13b, and 13c corresponding to the units. Some armature manufacturing process steps require rotation of armature work pieces during processing. For example, turning operations performed by unit 10b require that subassembly 14 rotate while commutator portions are in contact with a cutting tool (not shown). In addition to seating extreme portions 14' and 14" of axial shafts as described above, V-seats 13''' are also suitably shaped to allow axial rotation of subassemblies 14. Rotational motion may be imparted to subassemblies 14 by a belt drive (not shown) in contact with central portion 14''' (see, e.g., Sbalchiero et al.).

Figure 3:
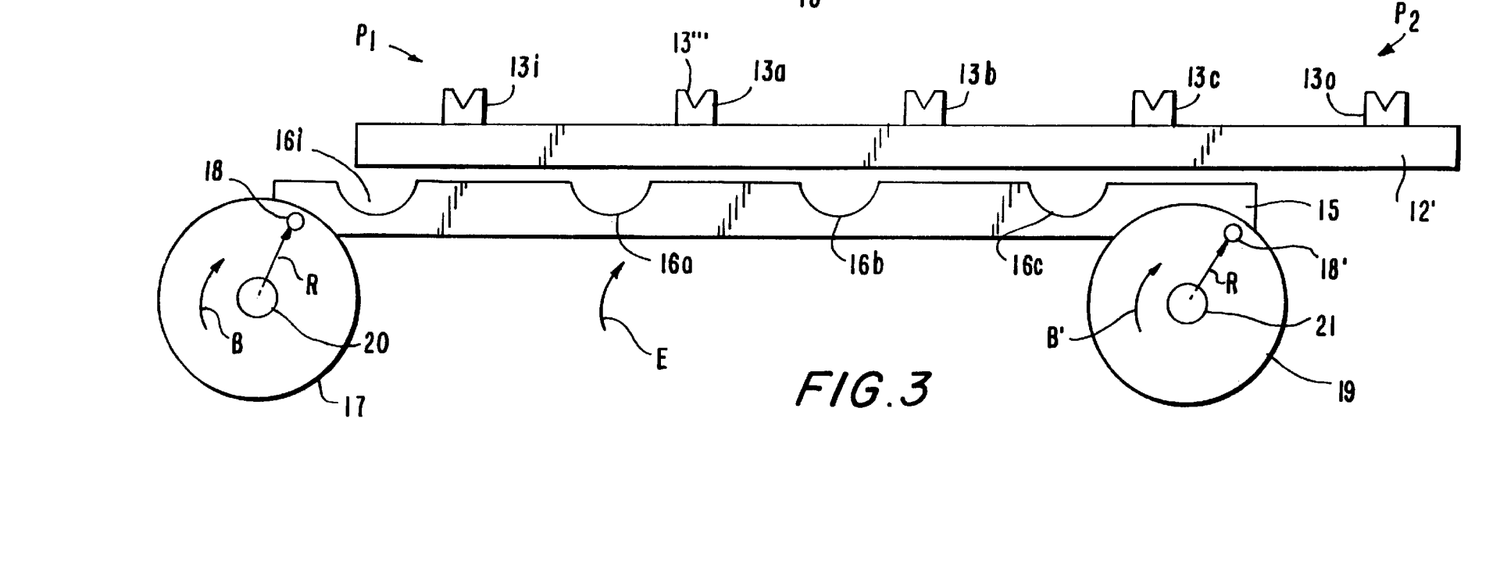
FIG. 3 is a side elevational view partly in cross section showing empty receiving structures (i.e., without armature subassemblies) disposed on a beam and a transferor for advancing a row of subassemblies.

After a subassembly 14 is processed at one step of the manufacturing process, it must be moved forward for processing according to the next step of the manufacturing process. Movable central beam 15 substantially concurrently transfers a group of subassemblies 14 forward. The group of subassemblies 14 transferred includes one or more subassemblies 14 that may be positioned in receiving structures 13in, 13a, 13b, and 13c. With continued reference to FIG. 1, central beam 15 is located between beams 12 and 12T. Central beam 15 has a row of holders 16. Holders 16 may have any suitable shapes, for example, semicircular shapes, to support and hold subassemblies 14 by their central portions 14'''. Holders 16 with semicircular shapes are referred to hereinafter as cradles 16. The number of cradles 16 on beam 15 is one less than the number of receiving structures 13. Cradles 16 are equally spaced on beam 15 at substantially the same spacing as receiving structures 13 are spaced on beams 12 and 12'. Beam 15 is parallel to beams 12 and 12' with cradles 16 aligned with receiving structures 13. The number of subassemblies that can be held and moved simultaneously in a group is equal to the number of cradles 16. FIG. 3 illustrates the relative alignment of cradles 16 with receiving structures 13. FIG. 3 is a side elevational view from 3—3 of FIG. 1.

FIG. 3 shows central beam 15 at rest at a starting position. At the starting position, beam 15 is at a vertical height lower than the vertical height of beams 12 and 12'. The vertical height of beam 15 is kept sufficiently low so as to avoid any hindrance in processing subassemblies 14 that are placed in receiving structures 13. When beam 15 is at the starting position, cradles 16 are below the plane formed by receiving structures 13. Also, cradles 16a, 16b, 16c, and 16d are to the left of receiving structures 13in, 13a, 13b, and 13c, respectively. Receiving structures 13a, 13b, and 13c can have armature subassemblies 14 with their extreme shaft portions positioned in V seats 13''' as suitable for processing by units 10a, 10b, and 10c. The leftmost receiving structure 13in may hold subassembly 14i as input ready for processing next by unit 10a. For clarity these armature subassemblies 14 are not shown in FIG. 3. As will be described in further detail below, central beam 15 moves to lift and substantially simultaneously advance a group of subassemblies 14 through units 10a, 10b and 10c. Each subassembly 14 in the group is lifted from the particular receiving structure 13 holding it and advanced to the next receiving structure 13 in the row of receiving structures 13.

Controlled movement of central beam 15 can be obtained, for example, through suitable mechanical linkages. With continued reference to FIG. 3, the left end of central beam 15 is mechanically hinged to disk 17 at radial point 18. The right end of the beam is hinged to disk 19 at radial point 18'. Disks 17 and 19 rotate about shafts 20 and 21, respectively. Radial points 18 and 19 are at substantially equal radial distances (=R) from shafts 20 and 21, respectively. Shafts 20 and 21 are aligned and placed at suitable vertical heights to maintain beam 15 substantially parallel to and aligned with beams 12 and 12'.

Suitable power mechanisms may be used to controllably impart rotational motion to either or both disks 17 and 19. For example, a motor drive (not shown) may controllably rotate disk 17 in direction B around shaft 20. Disk 19 may rotate freely on shaft 21. As disk 19 is mechanically linked to disk 17 by central beam 15, disk 19 will rotate in tandem with disk 17. When disk 17 rotates an amount in direction B, disk 19 will rotate an equal amount in direction B'. Further, all portions of central beam 15 (including cradles 16 and the ends of central beam 15) will move by the equal amount along circular trajectories in direction E. The circular trajectories are along circles that have a radius substantially equal to the radial distance, R, between point 18 and shaft 20. A full revolution of disk 17 around shaft 20 in direction B, will cause each portion of central beam 15 to execute a full circle in direction E. On executing this full circle, central beam 15 returns to its starting position (shown in FIG. 3) with cradles 16 to the left of receiving structures 13.

The circular motion of beam 15 is designed to cause a row of subassemblies that may be present in receiving structures 13in, 13a, 13b, 13c, to be advanced forward along the row of receiving structures 13. The design parameters include, for example, the spacing of cradles 16, the radial distance R, and the vertical height of central beam 15 in its starting position relative to beams 12 and 12'.

Figure 4:
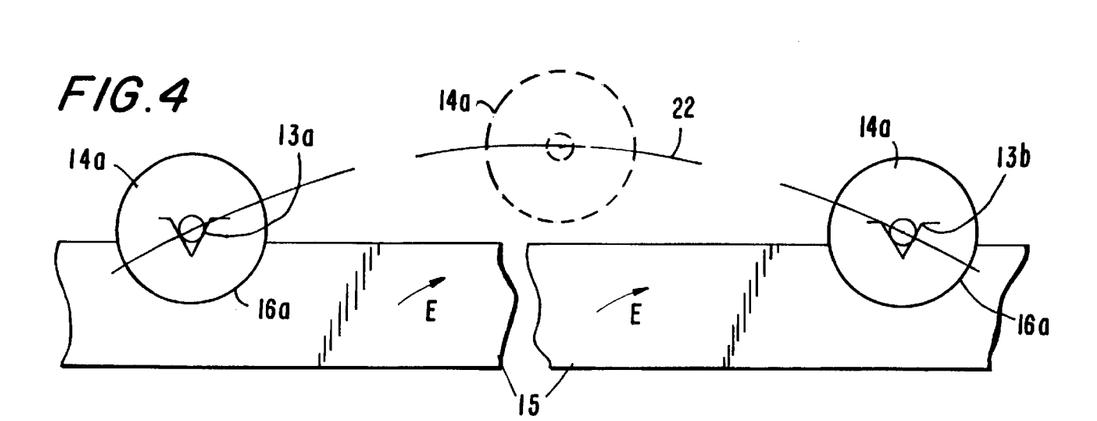

The transfer of subassemblies 14 effected by the circular movement of central beam 15 is further described with reference to FIG. 4. FIG. 4 shows the transfer of subassembly 14a from receiving structure 13a to receiving structure 13b. Receiving structure 13a is immediately to the right of cradle 16a when beam 15 is at the starting position (FIG. 3). Receiving structure 13b is the next structure to the right of receiving structure 13a.

The left portion of FIG. 4 shows central beam 15 after cradle 16a has rotated forward from the starting position in direction E by an amount sufficient to put cradle 16a in contact with central portions 14" of subassembly 14a seated in receiving structure 13a. Further rotation of cradle 16a in direction E causes cradle 16a to lift extreme shaft portions 14' and 14" of subassembly 14a out of V-seats 13'". Cradle 16a then holds subassembly 14a by supporting central portion 14'". As cradle 16a holding subassembly 14a rotates away in direction E, receiving structure 13a becomes vacant and available to receive another subassembly 14i (not shown). Similarly, simultaneous circular motion of cradle 16b (not shown) removes any subassembly present in receiving structure 13b. This causes receiving structure 13b to become available to receive subassembly 14a. Even further rotation of cradle 16a in direction E places held subassembly 14a in receiving structure 13b.

The right portion of FIG. 4 shows central beam 15 after this even further rotation. Subassembly 14a is shown positioned in receiving structure 13b. Cradle 16a is shown as it is just about to lose contact with central portion 14'" on continued rotation in direction E while returning to its starting position (FIG. 3). FIG. 4 also depicts trajectory 22 of the center of an axial shaft end of armature subassembly 14a as subassembly 14a is transferred from receiving structure 13a to 13b.

In a similar manner and simultaneously with the transfer of subassembly 14a from receiving structure 13a to 13b, the circular motion of central beam 15 as described above causes subassemblies 14 that may be present in receiving structures 13in, 13b, and 13c to be transferred to receiving structures 13a, 13c, and 13out, respectively. As mentioned earlier, receiving structure 13out can be used as a waiting location for output subassemblies 14 that have been processed through all three units, 10a, 10b, and 10c. The transfer of subassemblies 14 forward through workstation 10 leaves receiving structure 13in vacant. As mentioned earlier, receiving structure 13in can be used to stage input to workstation 10, i.e., to receive input subassemblies 14 for processing in workstation 10.

Input and output subassemblies 14 may be transported to and from work station 10 using prior art transport systems in which subassemblies 14 are carried in pallets on belt conveyors (see, e.g., Santandrea et al.). Using such transport systems, subassemblies 14 processed upstream of work station 10 may be delivered to workstation 10 for further processing. And subassemblies 14 that have been processed through workstation 10 may be delivered to downstream locations for further processing. Workstation 10 may be integrated for use with conventional assembly line transport systems (not shown). Belt conveyors 25 of workstation 10 run in direction C along front side D of units 10a, 10b, and 10c. Subassemblies 14 are carried in pallets 24 on belt conveyors 25. Conventional transfer machines, for example, pick and place units with grippers that travel on overhead tracks, may be used to move subassemblies 14 between pallets 24 and workstation 10. Subassemblies 14 are moved between pallets 24 and workstation 10 in a direction which is substantially parallel to their (subassemblies) longitudinal axis (e.g., direction F1, FIG. 1), but which at the same time is also substantially perpendicular to the direction of work flow in workstation 10 or on conveyors 25 (e.g., direction C, FIG. 1)

In operation, with continued reference to FIG. 1, pallet 24 delivering an input subassembly 14 for processing at work station 10 is stopped on belt 25 at reference location P1. Transfer device 23, for example, a pick and place unit, using gripper 23' collects input subassembly 14 from stopped pallet 24 and loads input subassembly 14 in receiving structure 13in. Gripper 23' grasps central portion 14'" to pick up input subassembly 14 from pallet 24. Gripper 23' then moves along overhead linear tracks (not shown) in direction F1 substantially perpendicular to direction C. Gripper 23' stops moving at a position above receiving structure 13in, and then releases subassembly 14 into receiving structure 13in. Empty pallet 24 (with input subassembly 14 picked up) is released for immediate travel in direction C on belt conveyors 25.

Empty pallet 24 may be stopped again at or ahead of reference location P2 to await output subassembly 14 that has been processed through units 10a, 10b and 10c. There may be several empty pallets 24 on belt conveyors 25 at any given time, each of the several empty pallets 24 having delivered one of subassemblies 14 that are being concurrently processed in units 10a, 10b, and 10c. FIG. 1 shows empty pallet 24' stopped at location P2 in position to receive an output subassembly 14 from receiving structure 13out. FIG. 1 also shows two other empty pallets 24 queued up behind pallet 24'.

Transfer device 26, which may be similar to transfer device 23, collects output subassembly 14 (not shown) from receiving structure 13out and transfers it to empty pallet 24'. In operation, gripper 26' of transfer device 26 grasps central portion 14'" to pick up output subassembly 14 from receiving structure 13out. Gripper 26' then moves along overhead linear tracks (not shown) in direction F2 substantially perpendicular to direction C. Gripper 26' stops moving at a position above empty pallet 24', and then releases subassembly 14 into empty pallet 24'. Gripper 26' then releases output subassembly 14 into empty pallet 24'. Pallet 24' carrying output assembly 14 may now be released for travel to downstream locations. Next, the other empty pallets 24 that were queuing up behind pallet 24' may be stopped in turn at location P2 to pick up subsequent output of workstation 10.

This manner of delivering input subassemblies 14 and picking up output subassemblies 14 makes it possible to load armature subassemblies into workstation 10 at position P1, at substantially the same time that the armature subassemblies are being unloaded at position P2. An effective processing time at workstation 10 is the time between delivery of an input subassembly and the pick up of an output subassembly. The loading and unloading operations may occur even as other subassemblies (e.g., 14a, 14b, and 14c) are being processed by units 10a, 10b, and 10c. In an assembly line with a continuous or steady work flow, simultaneous loading and unloading subassemblies makes the effective processing time at work station 10 substantially small. The effective processing time is about the same time as it takes to load or unload a subassembly 14 using transfer devices 23 or 26. The waiting time periods for loading and unloading from individual step-processing units, for example, as required in prior art assembly lines, are eliminated. This increases manufacturing efficiency.

Also, the configuration of workstation 10 as illustrated in FIG. 1 provides ample and comfortable operator access to units 10a, 10b and 10c. The positioning of belt conveyors 25 on front side D of workstation 10 (alongside beam 12) provides open space for accessing units 10a, 10b, and 10c. The open space is not cluttered, for example, with the multiple transfer devices that may be used in prior art assembly lines for loading and unloading subassemblies from individual units 10a, 10b, and 10c. Transfer devices 23 and 26 used with the present configuration of workstation 10 are to the side of workstation 10 away from the open space around units 10a, 10b, and 10c. Further, transfer devices 23 and 26 have grippers 23' and 26' that move in directions F1 and F2 on overhead linear tracks and do not impede operator access to units 10a, 10b, or 10c.

It will be understood that the number of step-processing units in workstation 10 is, only for purposes of illustration, shown to be exactly three (units 10a, 10b, and 10c, FIG. 1). In accordance with the invention, workstation 10 may include a sequence consisting of any suitable number of step-processing units. For example, workstation 10 may include two separate units for coarse turning and fine turning operations (instead of a single turning unit, i.e., unit 10b) so that the total number of units increases to four. The suitable number of units in the sequence may be as few as one. For example, workstation 10 may include only an inspection unit. The single inspection unit may be used, for example, to inspect the quality of a sample of subassembly work flow in an assembly line. Subassemblies that are not part of the sample may, optionally, be transported directly from upstream locations to downstream locations on conveyors 25 bypassing the inspection unit.

Beams 12 and 12' that support receiving structures 13, and beam 15 that supports cradles 16 may have suitable constructions so that their lengths (i.e., the number of receiving structures 13 and cradles 16, respectively) can be adjusted according to the number of step-processing units in workstation 10. Reference locations P1 and P2 at which subassemblies are respectively loaded and unloaded may also be suitably adjusted to correspond to the number of step-processing units in workstation 10.

Further, a previously described feature of the configuration of workstation 10 enables use of workstation 10 for processing armature subassemblies of different lengths at workstation 10. As mentioned earlier, beams 12 and 12' can be moved laterally in directions G1 and G2 on support structures 12a and 12b (FIG. 1). By such movement the distance between beams 12 and 12' may be suitably adjusted so that blocks 13' and 13" of receiving structures 13 are appropriately spaced to seat an armature subassembly of a given length L (FIG. 2). This feature of workstation 10 allows workstation 10 to be integrated into manufacturing assembly lines that batch-process armature subassemblies of different lengths. Such assembly lines may use prior art adjustable transport systems that can transport subassemblies of different sizes. For example, Santandrea et al. disclose adjustable pallets (similar to pallet 24, FIG. 1) for transporting subassemblies of different sizes. Adjusting stations such as disclosed, for example, by Santandrea et al., may be used to adjust pallet size upstream of workstation 10 to accommodate subassemblies of different lengths. In these adjustable transport systems belt conveyors (similar to belt conveyors 25, FIG. 1) may be used to deliver batches of different length subassemblies to workstation 10. Workstation 10 may be converted to accommodate different length subassemblies during the idle times existing between manufacturing of the batches.

Another embodiment of the present invention is described below with reference to portions of a workstation illustrated in FIGS. 5–7.

Figure 5:
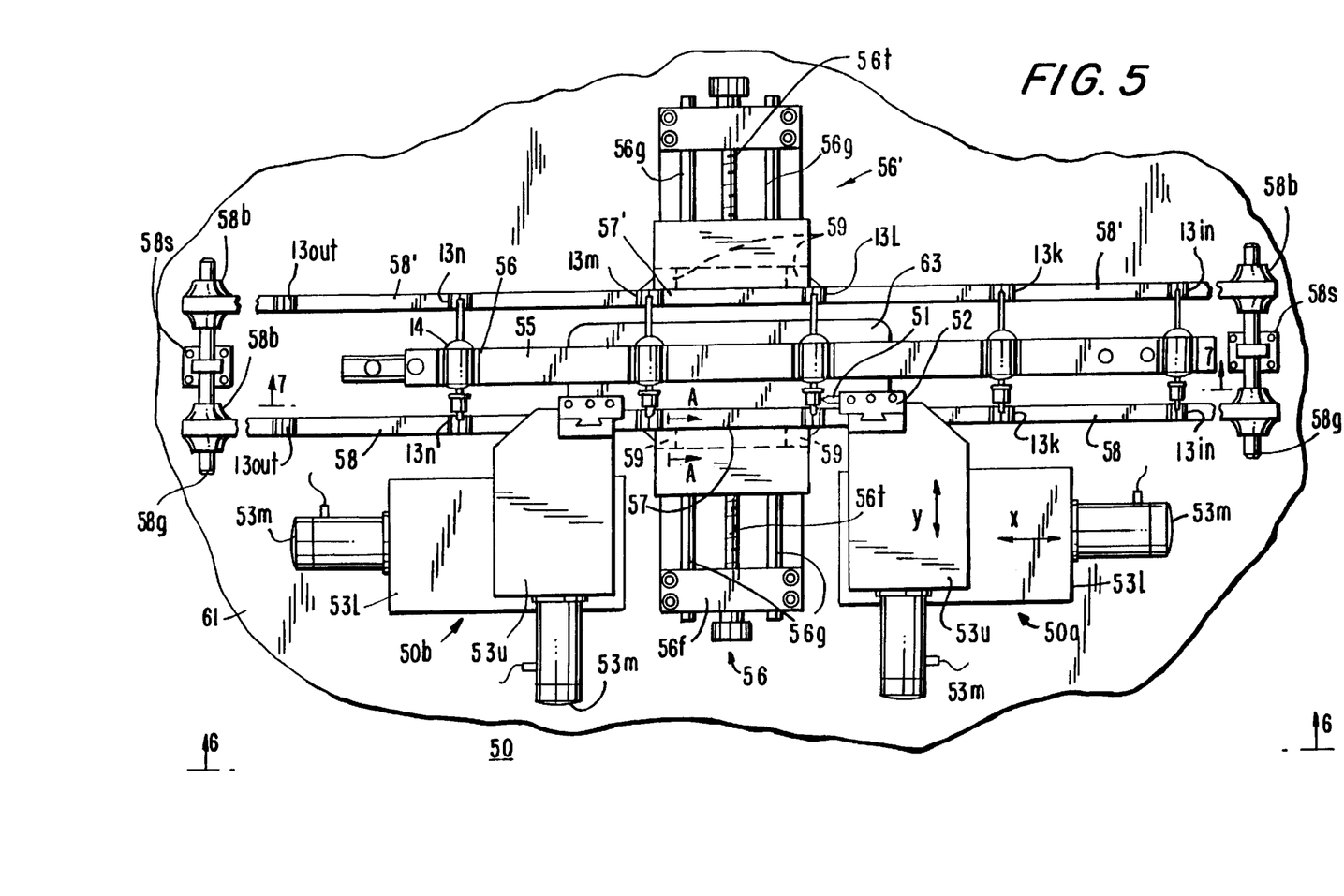
FIG. 5 is a plan view of a portion of another work station configured in accordance with the principles of this invention.
Figure 6A:
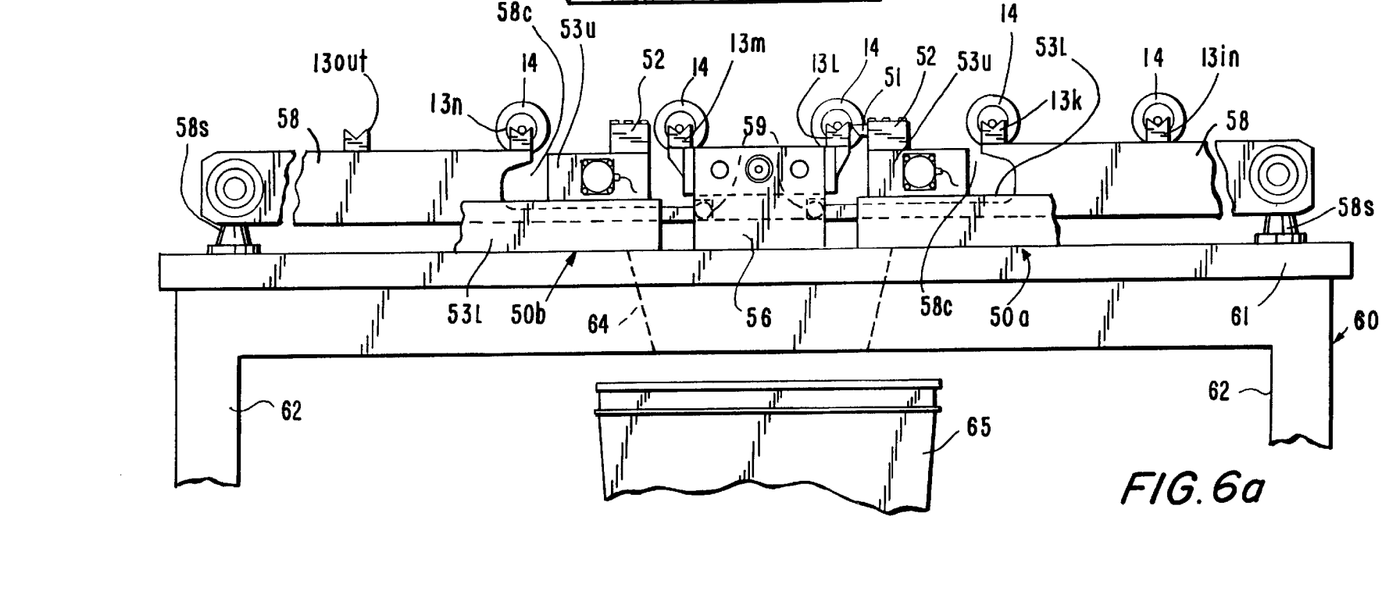
Figure 6B:
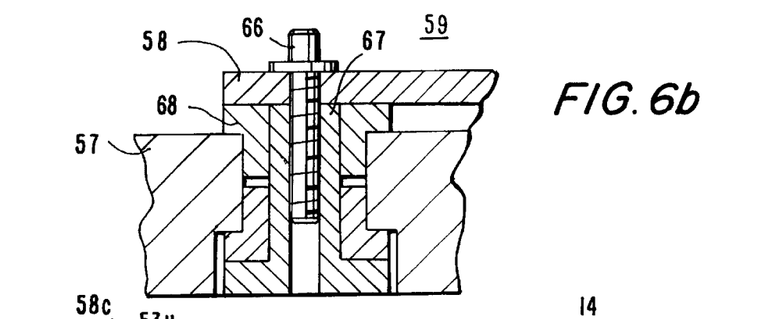

FIG. 5 is a plan view of portions of workstation 50. FIG. 6a is a side elevational view of workstation 50. In both FIGS. the workflow is in the X direction from right to left. Workstation 50 includes table 60 with top table top 61 supported, for example, off an assembly line floor, by legs 62. Aperture 63 allows passage of processing-related debris from above table top 61 to below table top 61.

Workstation 50 includes a sequence of step-processing units. The sequence may include, for example, coarse turning unit 50a and fine turning unit 50b. Units 50a and 50b may rest directly on table top 61. For clarity, other step-processing units that may be included in the sequence are not shown. Workstation 50 includes a row of equally spaced receiving structures 13. Each receiving structure 13 includes a pair of spaced-apart blocks 13' and 13" with suitably shaped seats 13''' to hold subassemblies 14 (FIG. 2). Walking beam 55 supports a row of cradles 56 aligned with the row of receiving structures 13. Walking beam 55 operates above table top 61 and between blocks 13' and 13" of receiving structures 13. Controlled movement of walking beam 55 in an approximately rectangular path (as will be further described below with reference to FIG. 7) advances subassemblies 14 along the row of receiving structures 13. Subassemblies 14 are advanced in the direction of workflow through workstation 50. The row of receiving structures 13 may include receiving structures 13in and 13out for holding input subassemblies transported to workstation 50 and output subassemblies for transport from workstation 50, respectively. The row also includes receiving structures 13k, 13l, 13m, and 13n that can hold subassemblies 14 in position for processing by associated step-processing units in workstation 50. For example, units 50a and 50b perform turning operations on commutator portions of subassemblies 14 positioned in receiving structures 13k and 13m, respectively.

Units 50a and 50b may be conventional turning units. Units 50a and 50b use conventional tool bits 51 having cutting edges, for turning. Tool bits 51 are mounted on conventional motorized X-Y translation stages using conventional mounting fixtures 52. For clarity, tool bit 51 associated with unit 50b is not shown. Upper and lower carriages 53u and 53l of the X-Y translation stages are driven by motors 53m. Upper carriages 53u are movable in directions Y, and can be used to drive cutting tools 51 along the length, for example, of commutator portions of subassemblies 14 that are being turned. Lower carriages 53l are movable in directions X, and can be used to drive cutting tool 51 to suitable positions to obtain desired cutting depths. The range of travel of carriages 53*u* and 53*l* in the X and Y directions defines a work zone or region over which units 50*a* and 50*b* are capable of cutting operations. Aperture 63 may be suitably placed directly below this zone or region. Burrs and other cutting debris resulting from the cutting operations fall below table top 61 through aperture 63. Duct 64 guides the debris into burr collector 65. Collector 65 may be placed, for example, underneath table top 61.

Receiving structures 13*l* and 13*m* associated with units 50*a* and 50*b*, respectively, are supported on of a pair of linear translation stages 56 and 56'. Stages 56 and 56' have movable carriages 57 and 57', respectively. Blocks 13' (FIG. 2) of receiving structures 13*l* and 13*m* may, for example, be supported on carriage 57, while blocks 13" are supported on carriage 57'. Linear translation stages 56 and 56' may themselves rest on table top 61. Each of linear translation stages 56 and 56' includes frame 56*f* holding guide rods 56*g*. Carriages 57 and 57' adjustably slide on guide rods 56*g* in directions Y. Suitable drive mechanisms may be used to adjust the position of carriages 57 and 57'. For example, linear translation stages 56 and 56' may use manual screw drives. The manual drives may include threaded bars 56*t* connected to threaded bushings (not shown) on carriages 57 and 57'. Turning threaded bars 56*t* moves carriages 57 and 57' in directions Y.

Receiving structures (e.g., 13*in*, 13*k*, 13*n*, and 13*out*) other than those supported on carriages 57 and 57' may be supported on laterally spaced-apart beam structures running along the workstation 50 in the direction of the work flow. Each of these beam structures may be formed from one continuous beam or from more than one discontinuous beam segments. FIG. 5 shows, for example, receiving structures 13*in*, 13*k*, 13*n*, and 13*out* supported on pairs of substantially parallel beams 58 and 58'. Beams 58 extend in directions X through workstation 50 from both sides of carriage 57. Similarly, beams 58' extend in directions X through workstation 50 from both sides of carriage 57'. Beams 58 and 58' may optionally be attached to carriages 57 and 57', respectively. For example, FIG. 5 shows beams 58 and 58' mechanically coupled to carriages 57 and 57' through isolation blocks 59. Beams 58 and 58' may also be suitably shaped to provide step-processing units adequate working space to process subassemblies 14. For example, FIG. 6*a* shows cutouts 58*c* in beams 58. Cutouts 58*c* allow upper carriages 53*u* to travel in directions Y laterally past beams 58 for processing subassemblies 14 positioned in receiving structures 13*l* and 13*m*. Carriages 53*i* remain movable in directions X alongside an exterior surface of beam 58.

At ends remote from carriages 57 and 57', beams 58 and 58' have attached bushings 58*b* that can adjustably slide in directions Y on horizontal adjustment guides 58*g*. Guides 58*g* are held at a suitable vertical distance above table top 61 by supports 58*s*. The vertical distance is such that the row of receiving structures 13 is in a level plane above table top 61.

The lateral spacing between seats 13'" on blocks 13' and 13" of receiving structures 13 may be suitably adjusted to match the length, L, of subassemblies 14 (FIG. 2) that are being processed by workstation 50. The spacing may be adjusted by operation of linear translation stage 56 and 56'. By turning threaded bars 56*t*, carriages 57 and 57' may be moved to appropriate positions in directions Y so that blocks 13' and 13" in receiving structures 13*l* and 13*m* are spaced a suitable distance apart. Since beams 58 and 58' are mechanically coupled to carriages 57 and 57', they (beams 58 and 58') move together with carriages 57 and 57'. As a result, the spacings between blocks 13' and 13" in receiving structures 13*in*, 13*out*, 13*k*, and 13*n* (supported on beams 58 and 58') are also simultaneously adjusted to match the length, L, of subassemblies 14.

Linear stages 56 and 56' may be operated to adjust or fine-tune the spacing of blocks 13' and 13" even while subassemblies 14 are positioned in receiving structures 13, for example, receiving structures 13*l* and 13*m* associated with turning units 50*a* and 50*b*, respectively. Fine-tuning the spacing may, for example, accommodate variations in the length of subassemblies 14 in the work flow, and be desirable for turning operations performed by units 50*a* and 50*b*.

Operation of linear stages 56 and 56', and also the operation of units 50*a* or 50*b* may generate mechanical vibrations. To reduce transmission of these mechanical vibrations through beams 58 and 58' to other parts of workstation 50, isolation blocks 59 may have any suitable vibration-damping construction. An example of such a construction of blocks 59 is shown in FIG. 6*b* (taken along direction A—A in FIG. 5). FIG. 6*b* shows an end of beam 58 coupled to carriage 57 using conventional metal bolt 66 and core insert 67. Space 68 between core insert 67 and carriage 57 is packed with suitable anti-vibration material, for example, anti-vibration silane blocks and rubber rings.

Isolation blocks 59 also serve to substantially isolate subassemblies 14 positioned in receiving structures 13*m* and 13*l* from mechanical vibrations generated in other parts of workstation 50. For example, loading and unloading operations that involve depositing input subassemblies 14 into receiving structures 13*in* and picking up output subassemblies 14 from receiving structures 13*out*, respectively, may generate mechanical vibrations. In the operation of workstation 50, these loading and unloading operations may occur while other subassemblies 14 are being turned by units 50*a* and 50*b*. Isolation blocks 59 reduce transmission of loading and unloading vibrations to receiving structures 13*m* and 13*l*. The reduced transmission of vibrations enables turning operations to proceed substantially unaffected by contemporaneous loading or unloading operations.

It will be understood that other features of the configuration of work station 50, such as table 60 are also designed to minimize vibrations and to provide mechanical stability for processing operations. For example, in turning operations, the effect of floor and machine vibrations is often proportional to the distance between the cutting tool bit and the base of the turning unit. In workstation 50, the bases of turning units 50*a* and 50*b* do not rest on the assembly line floor but rest on table top 61. The relatively smaller distance, for example, between cutting tool 51 and the base of unit 50*a*, reduces the effect of vibrations on cutting operations.

Further, other components of workstation 50 such as other step-processing units, linear translation stages 56 and 56', and beams 57 and 57' are all supported in common on table top 61. All of the components supported by table top 61 may move substantially in unison with table top 61 in response to floor vibrations. This is unlike the conventional case where components are supported directly on the assembly line floor. In that case, different components may respond differently to floor vibrations and may exhibit large relative displacements with respect to each other. The movement in unison of components supported by table top 61 reduces the relative displacement of components and increases mechanical stability which is desirable for processing operations.

Further, at least in part to avoid undesirable coupling of vibrations, walking beam 55 and associated mechanical linkages for its controlled motion may be physically unconnected from table 60. For example, FIG. 7 shows walking beam 55 and associated mechanical linkages physically unconnected from table 60 with only vertical guide rods 73 passing through table top 61.

Figure 7:
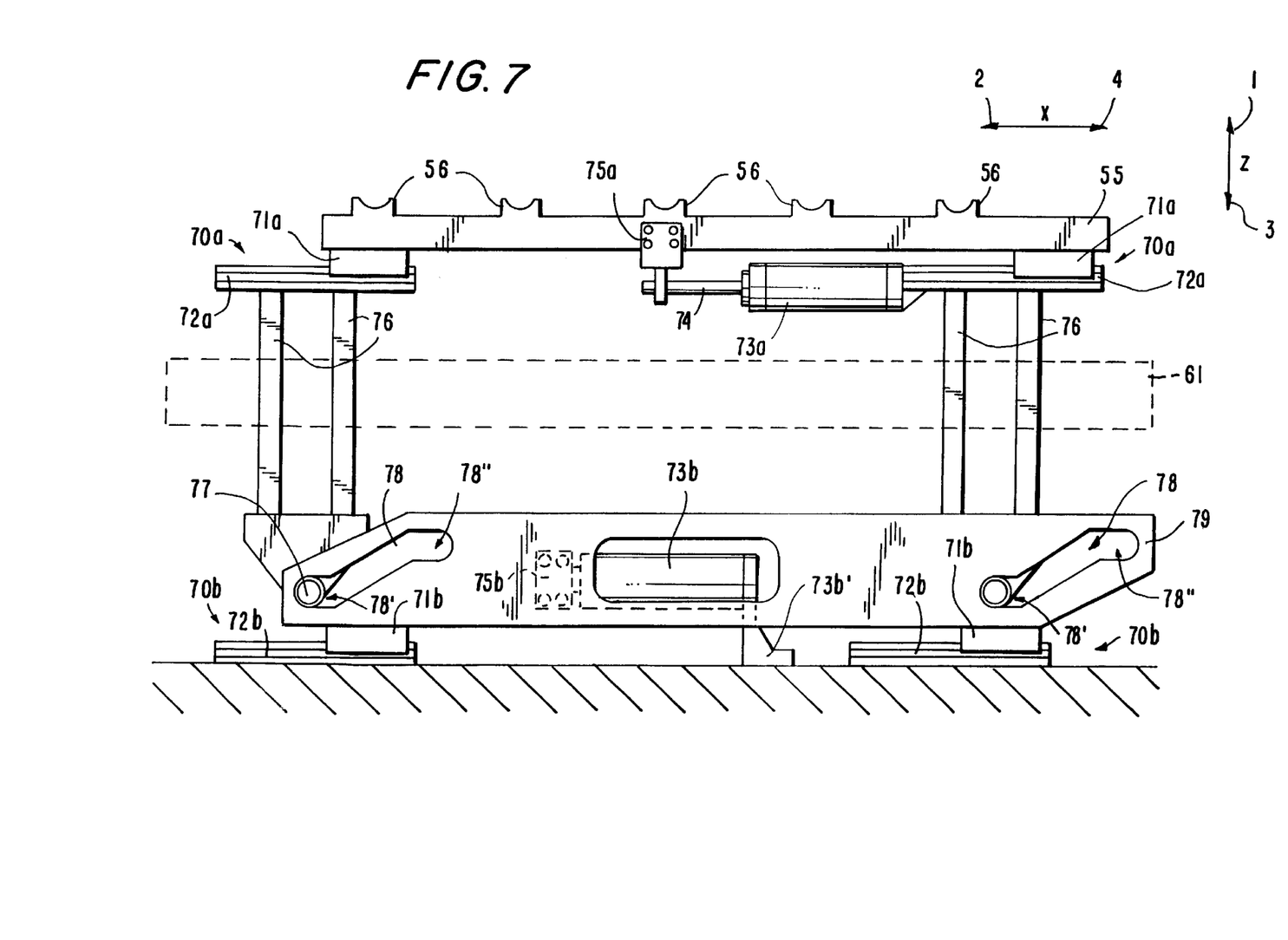
FIG. 7 is a side elevational view, partly in cross section, of mechanical linkages for imparting motion to the subassembly transfer beam of the workstation shown in FIG. 5 in accordance with the principles of this invention.

With reference to FIG. 7, walking beam 55 supports a row of cradles 56 aligned with the row of receiving structures 13 (FIG. 5). FIG. 7 is a side elevational view taken along line 7—7 in FIG. 5. For clarity the row of receiving structures 13 and other components of workstation 50 such as beams 58', and linear translation stage 56', are not shown. Cradles 56 have suitable shapes (e.g., semicircular shapes) to lift and hold subassemblies 14. Beam 55 is supported on a pair of linear slide assemblies 70a. Assemblies 70a may be dovetail slides, recirculating ball tracks, or any other type of conventional slide assemblies, that allow beam 55 to move in directions X. FIG. 7 shows, for example, a pair of dovetail slides 71a attached to ends of beam 55. Slides 71a rest slidably in horizontal tracks in guides 72a.

Controlled linear movement of beam 55 in directions X, for example, from positions 2 to 4 or vice versa, may be obtained using a suitable power mechanism, for example, air cylinder 73a. A side of cylinder 73a is attached, for example, to rightmost guide 72a. On the other side of cylinder 73a, cylinder rod 74 is mechanically connected to beam 55 through appendix 75a. When air cylinder 73a is activated, cylinder rod 74 extends toward the left, and beam 55 slides on guides 72 toward position 2. Conversely, when air cylinder 73a is deactivated, cylinder rod 74 retreats toward the right, and beam 55 slides toward position 4.

Slide assemblies 70a are supported at a suitable distance above table top 61 on vertical guide rods 76. Guide rods 76 move vertically when activated by suitable drive mechanisms placed underneath table top 61. FIG. 7 shows pairs of vertical guide rods 76 extending downwards from the leftmost and the rightmost guides 72a. The pairs pass through table top 61 and terminate in structures with rollers 77. Rollers 77 are held slidably in slots 78 of drive beam 79. Slots 78 have substantially identical shapes so that when rollers 77 slide in slots 78 both pairs of guide rods 76 remain substantially vertical and parallel to each other. The shapes have low positions 78' at one end and high positions 78" at the other end. When rollers 77 are at low positions 78', beam 55 supported on top of guide rods 76 is at lower vertical position 3. And when rollers 77 are at upper positions 78", beam 55 is at upper vertical position 1.

Drive beam 79 is supported on a pair of linear slide assemblies 70b that allow beam 79 to move in directions X. Linear slide assemblies 70b may be any suitable conventional linear slides, and may, for example, be similar to slide assemblies 70a. FIG. 7 shows a pair of dovetail slides 71b attached to beam 79. Slides 71b rest slidably in horizontal tracks in guides 72b. Guides 72b are themselves placed on the assembly line floor underneath table top 61.

Controlled upward or downward movement of beam 55 in directions Z, for example, from positions 3 to 1 or vice versa, may be obtained using a suitable power mechanism, for example, air cylinder 73b (similar to air cylinder 73a) to move beam 79. One side of cylinder 73b is attached to floor support 73b'. On the other side of cylinder 73b, a cylinder rod (not shown) is mechanically connected to beam 79 through appendix 75b. When air cylinder 73b is activated, the cylinder rod extends toward the left causing beam 79 to slide to the left. As beam 79 slides to the left, rollers 77 slide to upper positions 78" of slot 78, and cause beam 55 to move to upper vertical position 1. Conversely, when air cylinder 73b is deactivated the cylinder rod retreats toward the right causing beam 79 to slide to the right. As beam 79 slides to the right, rollers 77 slide to lower positions 78' of slot 78, and cause beam 55 to move to lower vertical position 3.

Vertical positions 1 and 3, and horizontal positions 2 and 4 of beam 55 are designed such that sequential movement of beam 55 between the positions causes a group of subassemblies that may be present in the row of receiving structures 13 to be advanced forward along the row. In position 3, cradles 56 are aligned with but below the horizontal plane of receiving structures 13. In position 1, cradles 56 are aligned with but above the horizontal plane of receiving structures 13.

In operation, vertical movement of beam 55 from position 3 to position 1 causes cradles 56 to move upwards lifting subassemblies 14 out of receiving structures 13. Next, horizontal movement of beam 55 from position 4 to position 2 advances cradles 56 to a position above the adjoining receiving structures 13. Further, downward movement from position 1 to position 3 causes cradles 56 to move downwards redepositing held subassemblies 14 in the adjoining receiving structures 13 underneath. Finally, horizontal movement from position 2 to position 4 causes beam 55 to return to a starting position with cradles 56 underneath the row of receiving structures 13.

One skilled in the art will appreciate that the present invention can be practiced by other than the described embodiment, which is presented for purposes of illustration and not of limitation.

What is claimed is:

1. A workstation for substantially concurrently processing subassemblies that are at different stages of a dynamoelectric machine core manufacturing process, comprising:

a row of subassembly receiving structures placed in a workflow direction wherein said row includes a first receiving structure in an upstream area and a last receiving structure in a downstream area, and wherein said receiving structures are designed for holding said subassemblies in position for processing;

a sequence of processing units wherein each unit processes said subassemblies that are at one of said stages, and wherein each unit is associated with at least one of said receiving structures;

a table having a table top supported above a floor on legs wherein said table top has a length along said workflow direction and a lateral width perpendicular to said work flow direction, and wherein said receiving structures and at least one of said units are supported on said table top; and a transferor for substantially simultaneously advancing a group of said subassemblies through said row of receiving structures, said transferor comprises a movable central beam having a row of subassembly holders disposed thereon wherein said central beam operates above said table top.

2. The workstation defined in claim 1 wherein said holders have shapes suitable for contacting central portions of said subassemblies.

3. The workstation defined in claim 2 wherein said shapes are semicircular shapes.

4. The workstation defined in claim 1 wherein each of said receiving structures comprises a pair of laterally spaced-apart seats for supporting extreme portions of said subassemblies, and wherein said movable central beam operates above said table top between said spaced-apart seats.

5. The workstation defined in claim 4 wherein said seats are V-shaped.

6. The workstation defined in claim 4 wherein lateral separation of said seats in said pair is adjustable.

7. The workstation defined in claim 4 wherein at least one of said receiving structures is disposed on laterally spaced-apart beams running along said workflow direction, and wherein said beams are supported above said table top.

8. The workstation defined in claim 7 wherein at least one of said beams has a cutout for providing at least one said unit access laterally across said beam to said subassemblies positioned in said receiving structure associated with said unit.

9. The workstation defined in claim 8 wherein said unit includes a X-Y translation stage having first and second sliding carriages, and wherein said first carriage is movable laterally across said beam through said cutout and said second carriage is movable alongside an exterior surface of said beam.

10. The workstation defined in claim 7 wherein said spaced-apart beams comprise a pair of beam segments that are continuous over the entire length of said row of receiving structures.

11. The workstation defined in claim 10 wherein said pair of beam segments is adjustably supported at both ends on supports that are suitable for adjusting lateral separation of said beams segments.

12. The workstation defined in claim 7 wherein said beams comprise beam segments that are discontinuous along said row of receiving structures.

13. The workstation defined in claim 4 wherein a seat of at least one said receiving structures is disposed on a movable carriage of a linear translation stage, said stage supported on said table top.

14. The workstation defined in claim 13 wherein at least another of said receiving structures is disposed on laterally spaced-apart beams supported on said table top.

15. The workstation defined in claim 14 wherein at least one of said beams is attached to said movable carriage.

16. The workstation defined in claim 15 wherein said beam is attached to said movable carriage through an isolation block for reducing transmission of vibrations.

17. The workstation defined in claim 4 wherein said transferor further comprises mechanical linkages for imparting motion to said central beam, said motion designed to move said holders along a path to lift said subassemblies from said row of receiving structures and redeposit said subassemblies in next said receiving structures in said row.

18. The workstation defined in claim 17 wherein said path is substantially rectangular, and said mechanical linkages comprise:
   a sliding assembly attached to said central beam for to and fro movement of said central beam along said workflow direction; and
   a vertically-movable support rod for upward and downward movement of said central beam, said support rod attached to said sliding assembly above said table top, passing through said table top, and connected to drive mechanisms placed underneath said table top.

19. The workstation defined in claim 18 wherein said drive mechanisms comprise:
   a movable drive beam supported on a sliding assembly, said drive beam having a slot that has a high position at one end and a low position at the other end; and
   a roller attached to said support rod, said roller slidably held in said slot such that when said drive beam slides in a forward direction said roller slides to said high position pushing said vertical rod upward and when said drive beam slides in a reverse direction said roller slides to said low position pulling said vertical rod downward.

20. The workstation defined in claim 1 wherein said table top includes an aperture, said aperture providing a passage for processing-related debris from above said table top to a collector underneath said table top.

21. The workstation defined in claim 20 wherein said unit is a turning unit capable of cutting operations over a region, and wherein said aperture is placed below said region to allow burrs and chips to fall through said table top.

22. The workstation defined in claim 1 wherein input and output subassemblies are transported to and from said workstation in pallets, further comprising:
   a first transfer device for picking up said input subassemblies from said pallets, moving said input subassemblies along a first direction that is substantially perpendicular to said workflow direction, and placing said input subassemblies in said first receiving structure; and
   a second transfer device for picking up said output subassemblies from said last receiving structure, moving said output subassemblies along a second direction that is substantially perpendicular to said workflow direction, and placing said output subassemblies in empty pallets.

23. The workstation defined in claim 1 further comprising a belt conveyor for transporting empty pallets from said upstream area to said downstream area wherein said belt conveyor runs alongside said sequence of units substantially parallel to said workflow direction.

24. A workstation for substantially concurrently processing subassemblies that are at different stages of a dynamoelectric machine core manufacturing process, comprising:
   a row of receiving structures that are designed for holding said subassemblies in position for processing wherein said row includes a first receiving structure in an upstream area and a last receiving structure in a downstream area, and wherein said receiving structures are disposed on a pair of spaced-apart beam structures running continuously across said workstation in a workflow direction;
   a sequence of processing units wherein each unit processes said subassemblies that are at one of said stages, and wherein each unit is associated with at least one of said receiving structures; and
   a transferor for substantially simultaneously advancing a group of said subassemblies through said row of receiving structures, said transferor comprises a movable central beam having a row of subassembly holders disposed thereon.

25. The workstation defined in claim 24 wherein said holders have shapes suitable for contacting central portions of said subassemblies.

26. The workstation defined in claim 25 wherein said shapes are semicircular shapes.

27. The workstation defined in claim 24 wherein each of said receiving structures comprises a pair of laterally spaced-apart seats for supporting extreme portions of said subassemblies.

28. The workstation defined in claim 27 wherein said seats are V-shaped.

29. The workstation defined in claim 24 wherein at least one of said beam structures has a cutout for providing at least one said unit access laterally across said beam to said subassemblies positioned in said receiving structure associated with said unit.

30. The workstation defined in claim 29 wherein said unit includes a X-Y translation stage having first and second sliding carriages, and wherein said first carriage is movable laterally across said beam through said cutout and said second carriage is movable alongside an exterior surface of said beam.

31. The workstation defined in claim 24 wherein said pair of beam structures is adjustably supported at both ends on supports that are suitable for adjusting lateral separation of said pair of beams.

32. The workstation defined in claim 31 wherein at least one of said beam structures comprises beam segments attached to and extending from a movable carriage of a linear translation stage.

33. The workstation defined in claim 32 wherein said beam is attached to said movable carriage through an isolation block for reducing transmission of vibrations.

34. The workstation defined in claim 24 wherein said transferor further comprises mechanical linkages for imparting motion to said central beam, said motion designed to move said holders along a path to lift said subassemblies from said row of receiving structures and redeposit said subassemblies in next said receiving structures in said row.

35. The workstation defined in claim 34 wherein said path is substantially rectangular, and said mechanical linkages comprise:
 a sliding assembly attached to said central beam for to and fro movement of said central beam along said workflow direction; and
 a vertically-movable support rod for upward and downward movement of said central beam, said support rod having an end attached to said sliding assembly and having another end connected to drive mechanisms.

36. The workstation defined in claim 35 wherein said drive mechanisms comprise:
 a movable drive beam supported on a sliding assembly, said drive beam having a slot that has a high position at one end and a low position at the other end; and
 a roller attached to said support rod, said roller slidably held in said slot such that when said drive beam slides in a forward direction said roller slides to said high position pushing said vertical rod upward and when said drive beam slides in a reverse direction said roller slides to said low position pulling said vertical rod downward.

37. The workstation defined in claim 34 wherein said path is substantially circular, and wherein said mechanical linkages comprise a pair of rotatable wheels to which ends of said central beam are hinged at a substantially equal radial distances from axises of said wheels.

38. The workstation defined in claim 24 further comprising a table having a table top supported above a floor on legs wherein said pair of spaced-apart beam structures and at least one of said units are supported on said table top, and said central beam operates above said table top between said pair of beam structures.

39. The workstation defined in claim 38 wherein said table top includes an aperture, said aperture providing a passage for processing-related debris from above said table top to a collector underneath said table top.

40. The workstation defined in claim 39 wherein said unit is a turning unit capable of cutting operations over a region, and wherein said aperture is placed below said region to allow burrs and chips to fall through said table top.

41. The workstation defined in claim 24 wherein input and output subassemblies are transported to and from said workstation in pallets, further comprising:
 a first transfer device for picking up said input subassemblies from said pallets, moving said input subassemblies along a first direction that is substantially perpendicular to said workflow direction, and placing said input subassemblies in said first receiving structure; and
 a second transfer device for picking up said output subassemblies from said last receiving structure, moving said output subassemblies along a second direction that is substantially perpendicular to said workflow direction, and placing said output subassemblies in empty pallets.

42. The workstation defined in claim 24 further comprising a belt conveyor for transporting said empty pallets from said upstream area to said downstream area wherein said belt conveyor runs alongside said sequence of units substantially parallel to said workflow direction.

43. A workstation for substantially concurrently processing subassemblies that are at different stages of a dynamoelectric machine core manufacturing process, comprising:
 a row of subassembly receiving structures placed in a workflow direction wherein said row includes a first receiving structure in an upstream area and a last receiving structure in a downstream area, and wherein said receiving structures are designed for holding said subassemblies in position for processing;
 a sequence of processing units wherein each unit processes said subassemblies that are at one of said stages, and wherein each unit is associated with at least one of said receiving structures; and
 a transferor for substantially simultaneously advancing a group of said subassemblies through said row of receiving structures, said transferor comprising:
  a movable central beam having a row of subassembly holders disposed thereon, said holders have shapes suitable for contacting central portions of said subassemblies; and
  mechanical linkages for imparting motion to said central beam, said motion designed to move said holders along a path to lift said subassemblies from said row of receiving structures and redeposit said subassemblies in next said receiving structures in said row.

44. The workstation defined in claim 43 wherein said path is substantially rectangular, and said mechanical linkages comprise:
 a sliding assembly attached to said central beam for to and fro movement of said central beam along said workflow direction; and
 a vertically-movable support rod for upward and downward movement of said central beam, said support rod attached to said sliding assembly and connected to drive mechanisms.

45. The workstation defined in claim 44 wherein said drive mechanisms comprise:
 a movable drive beam supported on a sliding assembly, said drive beam having a slot that has a high position at one end and a low position at the other end; and
 a roller attached to said support rod, said roller slidably held in said slot such that when said drive beam slides in a forward direction said roller slides to said high position pushing said vertical rod upward and when said drive beam slides in a reverse direction said roller slides to said low position pulling said vertical rod downward.

46. The workstation defined in claim 43 wherein said path is substantially circular, and wherein said mechanical linkages comprise a pair of rotatable wheels to which ends of said central beam are hinged at a substantially equal radial distances from axises of said wheels.

47. The workstation defined in claim 43 wherein said shapes are semicircular shapes.

48. The workstation defined in claim 43 wherein each of said receiving structures comprises a pair of laterally spaced-apart seats for supporting extreme portions of said subassemblies, and wherein said movable central beam operates between said spaced-apart seats.

49. The workstation defined in claim 48 wherein said seats are V-shaped.

50. The workstation defined in claim 48 wherein lateral separation of said seats in said pair is adjustable.

51. The workstation defined in claim 48 wherein at least one of said receiving structures is disposed on laterally spaced-apart beams running along said workflow direction.

52. The workstation defined in claim 51 wherein at least one of said beams has a cutout for providing at least one said unit access laterally across said beam to said subassemblies positioned in said receiving structure associated with said unit.

53. The workstation defined in claim 52 wherein said unit includes a X-Y translation stage having first and second sliding carriages, and wherein said first carriage is movable laterally across said beam through said cutout and said second carriage is movable alongside an exterior surface of said beam.

54. The workstation defined in claim 51 wherein said spaced-apart beams comprise a pair of beam segments that are continuous over the entire length of said row of receiving structures.

55. The workstation defined in claim 54 wherein said pair of beam segments is adjustable supported at both ends on supports that are suitable for adjusting lateral separation of said beams segments.

56. The workstation defined in claim 51 wherein said beams comprise beam segments that are discontinuous along said row of receiving structures.

57. The workstation defined in claim 48 wherein a seat of at least one said receiving structures is disposed on a movable carriage of a linear translation stage.

58. The workstation defined in claim 57 wherein at least another of said receiving structures is disposed on laterally spaced-apart beams.

59. The workstation defined in claim 58 wherein at least one of said beams is attached to said movable carriage.

60. The workstation defined in claim 59 wherein said beam is attached to said movable carriage through an isolation block for reducing transmission of vibrations.

61. The workstation defined in claim 48 further comprising a table having a table top supported above a floor on legs wherein said row of receiving structures and at least one of said units are supported on said table top, and said central beam operates above said table top between said pairs of seats.

62. The workstation defined in claim 61 wherein said table top includes an aperture, said aperture providing a passage for processing-related debris from above said table top to a collector underneath said table top.

63. The workstation defined in claim 62 wherein said unit is a turning unit capable of cutting operations over a region, and wherein said aperture is placed below said region to allow burrs and chips to fall through said table top.

64. The workstation defined in claim 43 wherein input and output subassemblies are transported to and from said workstation in pallets, further comprising:
   a first transfer device for picking up said input subassemblies from said pallets, moving said input subassemblies along a first direction that is substantially perpendicular to said workflow direction, and placing said input subassemblies in said first receiving structure; and
   a second transfer device for picking up said output subassemblies from said last receiving structure, moving said output subassemblies along a second direction that is substantially perpendicular to said workflow direction, and placing said output subassemblies in empty pallets.

65. The workstation defined in claim 64 further comprising a belt conveyor for transporting said empty pallets from said upstream area to said downstream area wherein said belt conveyor runs alongside said sequence of units substantially parallel to said workflow direction.

* * * * *